US006763999B2

(12) United States Patent
Coventry

(10) Patent No.: US 6,763,999 B2
(45) Date of Patent: Jul. 20, 2004

(54) SELF-SERVICE TERMINAL

(75) Inventor: Lynne Coventry, Edinburgh (GB)

(73) Assignee: NCR Corporation, Dayton, OH (US)

( * ) Notice: Subject to any disclaimer, the term of this patent is extended or adjusted under 35 U.S.C. 154(b) by 164 days.

(21) Appl. No.: 09/871,928

(22) Filed: Jun. 1, 2001

(65) Prior Publication Data
US 2001/0049660 A1 Dec. 6, 2001

(30) Foreign Application Priority Data

Jun. 6, 2000 (GB) .............................................. 0013703

(51) Int. Cl.⁷ .............................................. G06F 17/60
(52) U.S. Cl. ...................................... 235/379; 381/383
(58) Field of Search ................................ 235/379, 381, 235/383, 380, 492; 705/1, 10, 14, 39, 42

(56) References Cited

U.S. PATENT DOCUMENTS

| 4,674,041 A | * | 6/1987 | Lemon et al. ................. 705/14 |
| 5,619,558 A | * | 4/1997 | Jheeta ...................... 379/92.01 |
| 5,640,002 A | * | 6/1997 | Ruppert et al. ......... 235/462.46 |
| 5,652,421 A | | 7/1997 | Veeneman et al. |
| 6,012,049 A | * | 1/2000 | Kawan ......................... 705/41 |
| 6,196,464 B1 | * | 3/2001 | Patterson et al. ............ 235/477 |
| 6,223,983 B1 | * | 5/2001 | Kjonaas et al. .............. 235/379 |
| 6,311,165 B1 | * | 10/2001 | Coutts et al. .................. 705/21 |
| 6,456,981 B1 | * | 9/2002 | Dejaeger et al. .............. 705/14 |

FOREIGN PATENT DOCUMENTS

| EP | 0715282 | 6/1996 |
| WO | 8905489 | 6/1989 |
| WO | 9530215 | 11/1995 |
| WO | 9717680 | 5/1997 |
| WO | 9745796 | 12/1997 |
| WO | 0005670 | 2/2000 |

* cited by examiner

Primary Examiner—Michael G. Lee
Assistant Examiner—Kimberly D. Nguyen
(74) Attorney, Agent, or Firm—Michael Chan

(57) ABSTRACT

A self-service terminal (14) comprising a port for outputting transaction details is described. The terminal is operable to append current information relating to preferences (such as share prices, exchange rates, and such like) previously selected to transaction details output via the port. A method of providing current information relating to preselected preferences to a user at a terminal is also described. The method comprises the steps of: identifying a user; accessing a datastore to obtain preselected preferences associated with the user; obtaining current information relating to the preselected preferences; and, in response to a request to output transaction details to a port, appending the current information to the transaction details.

6 Claims, 4 Drawing Sheets

```
SHARES

NCR      $35.06
PPPP     $108
QQQQ     $53

EXCHANGE RATE

£1 TO $1.6602
```

SELF-SERVICE TERMINAL

BACKGROUND OF THE INVENTION

The present invention relates to a self-service terminal. In particular, the present invention relates to an automated teller machine (ATM).

Traditionally, ATMs have been used as a convenient mechanism for providing users with cash twenty-four hours a day. However, ATMs are increasingly used to provide other services, including financial services (such as cheque and cash deposit, bill payment, and such like) and information services (such as share prices, news headlines, and such like).

A disadvantage associated with ATMs providing additional services is that people waiting in a queue to use an ATM may have to wait longer than expected for the ATM to become available. This is because performing additional services at ATMs increases the time required for the ATM to conduct a transaction, thereby increasing user waiting time.

However, it is desirable to be able to provide a user with additional information as this attracts users to a particular ATM and improves the relationship between the owner of an ATM and a user of the ATM.

SUMMARY OF THE INVENTION

It is among the objects of an embodiment of the present invention to obviate or mitigate the above disadvantage or other disadvantages associated with self-service terminals.

According to a first aspect of the present invention there is provided a self-service terminal comprising a port for outputting transaction details, the terminal being characterised in that the terminal is operable to append current information relating to preferences previously selected to transaction details output via the port.

The port may be a receipt printer slot, a statement printer slot, or such like for delivering physical media. The transaction details may be printed or otherwise imaged on this media. The current information may be appended to a front face of the media; alternatively or additionally, the current information may be appended to a rear face of the media. In one embodiment, current information may be printed on the back of a receipt or a statement. Adding the current information to a receipt or statement has the advantage that a terminal screen is not cluttered with the current information. If the current information was displayed on a screen this may distract or confuse a user. Another advantage of adding the current information to a receipt or statement is that the user can review the current information at a later time when the user has left the vicinity of the terminal.

Alternatively, the port may be a wireless communication port, such as an IrDA compliant port, a Bluetooth (trade mark) compliant port, or such like. The transaction details may be provided in electronic or optical format.

By virtue of this aspect of the present invention current information on preferences previously selected by a user, such as the price of stock held by the user, the latest news headlines, or such like, can be delivered to the user without the user specifically requesting this information during each transaction.

By appending current information to transaction details requested by a user, the terminal does not generate an output specifically for the current information, the terminal only appends the current information to an output specifically requested by the user; thus, if a user does not request any output, no current information will be delivered to the user even if the user has selected preferences. This ensures that the length of each transaction is not adversely affected by providing a user with current information. This ensures that the average waiting time at an ATM is not increased by providing a user with current information.

Preferably, when the user has been identified the terminal accesses a datastore to retrieve selected preferences related to the user.

Preferably, the terminal obtains current information relating to these preferences while a transaction is being processed. This has the advantage that the time taken to complete a transaction is not significantly increased.

In one embodiment, if the terminal cannot obtain current information within a predetermined time (such as ten seconds) then the terminal aborts the step of retrieving current information. This has advantage that a transaction is not delayed if current information cannot be obtained quickly.

According to a second aspect of the present invention there is provided a method of providing current information relating to preselected preferences to a user at a terminal, the method comprising the steps of: identifying a user; accessing a datastore to obtain preselected preferences associated with the user; obtaining current information relating to the preselected preferences; and, in response to a request to output transaction details to a port, appending the current information to the transaction details.

The term "identifying", as used herein, is intended to include a claim to an identity, verifying an identity, and determining a user's identity. A claim to an identity may be made by a user inserting a magnetic stripe card having identification data stored thereon. Verifying an identity occurs when an entered PIN matches a PIN associated with a claimed identity. Determining a user's identity occurs when a biometrics system is used without the user claiming an identity.

The current information may be updated periodically (such as every ten minutes). Alternatively, the current information may be updated during each transaction.

The current information may be obtained by the terminal directly from a source of the information.

Alternatively, a server may obtain the current information from the source and the terminal may obtain the current information from the server. This may have a number of advantages.

(1) security may be improved because each terminal does not have direct access to an external source of information.

(2) if the network connecting the server to the terminals is a high bandwidth network then the information is conveyed very quickly, thereby minimising any delays in transmission, and consequently minimising any delays during a transaction.

(3) the server may extract the desired current information from other text and graphics that are not required, thereby: reducing the amount of information to be transmitted to the terminals, decreasing the transmission time, and decreasing the amount of processing required at each terminal.

(4) information is always available to each terminal within a short time period, even if the transmission rate from the external source to the server is very slow, as the server may only update information when all the new information has been received.

BRIEF DESCRIPTION OF THE DRAWINGS

These and other aspects of the invention will be apparent from the following specific description, given by way of example, with reference to the accompanying drawings, in which.

DETAILED DESCRIPTION

Figures 1, 6:
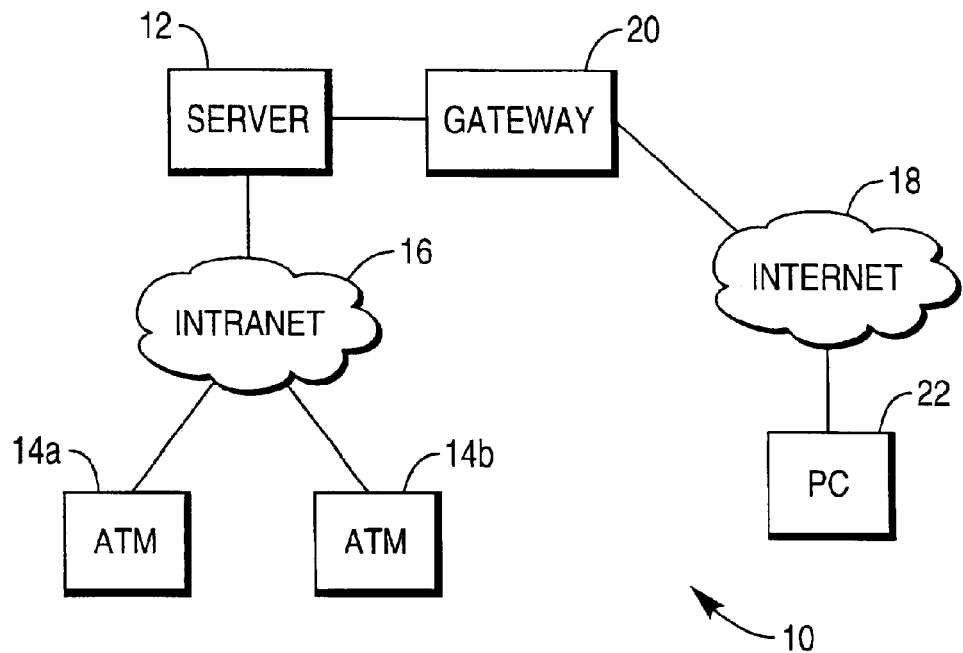
FIG. 1 is a block diagram of a server system according to one embodiment of the present invention.
FIG. 6 is a schematic diagram of the rear side of a receipt showing current information.

Referring to FIG. 1, there is shown a self-service terminal system 10 according to one embodiment of the present invention. The system 10 is owned and operated by a financial institution, and comprises a server 12 interconnected to a plurality of terminals 14 by a network 16. The server 12 authorises transactions entered at the terminals 14, and includes back-office facilities, as is known to those of skill in the art. The terminals 14 are in the form of ATMs (only two of which are shown) and the network 16 is in the form of a secure private Intranet.

The server 12 is connected to a public access network 18 in the form of the Internet by a gateway 20. As is known to those of skill in the art, the gateway 20 includes various security features, such as firewalls, to restrict access to the Intranet 16. Both the Intranet 16 and the Internet 20 are TCP/IP-based networks. As is well known in the art, numerous electronic devices, such as personal computers (PCs), cellular telephones, personal digital assistants (PDAs), and such like, may connect to the Internet 18; one such device, PC 22, is shown in FIG. 1.

Figure 2:
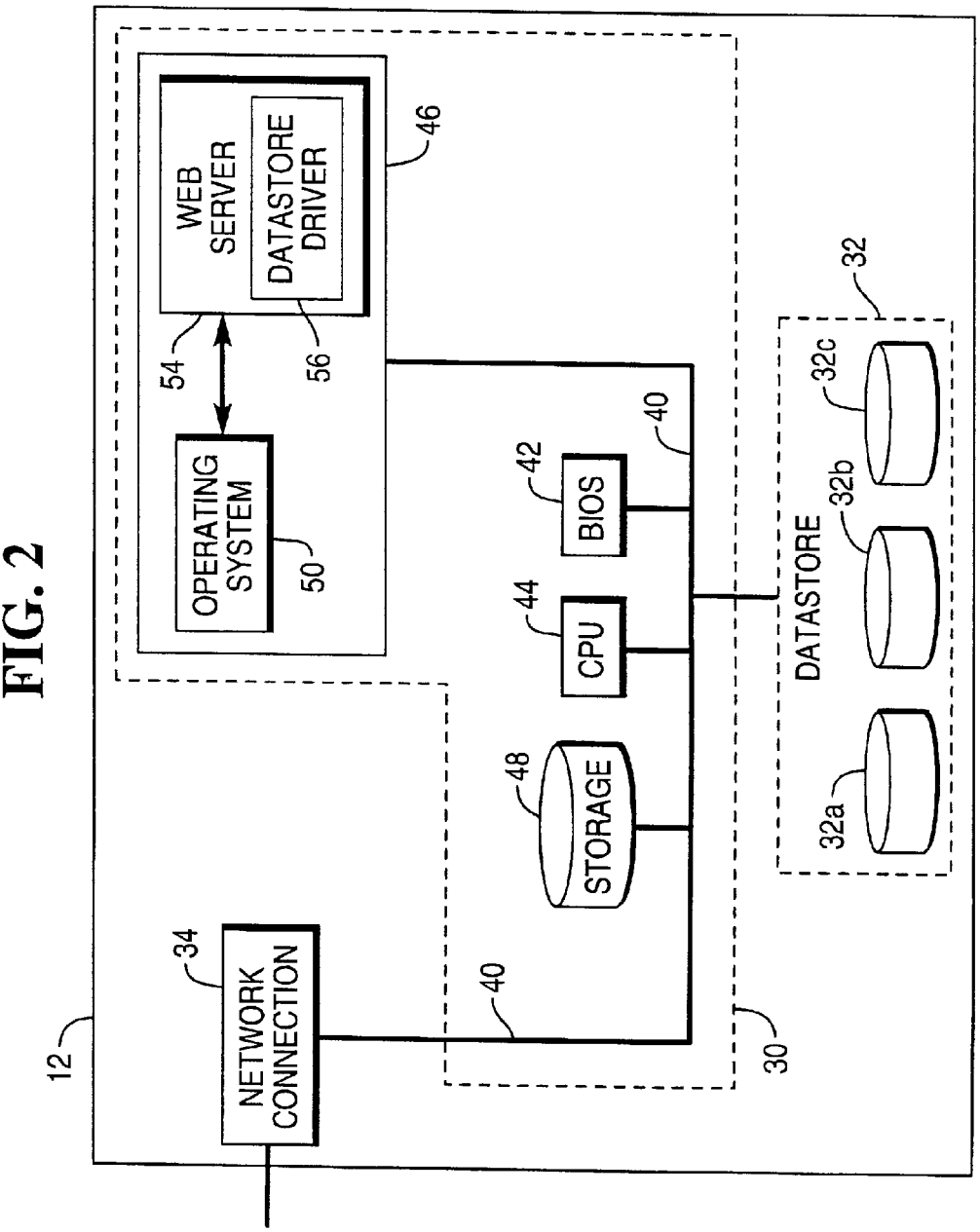
FIG. 2 is a block diagram of the server of FIG. 1.

Referring to FIGS. 1 and 2, the server 12 comprises a controller 30, a datastore 32, and a network connection 34. A system bus (or buses) 40 connects the network connection 34 to the controller 30 and datastore 32. The controller 30 further comprises a BIOS 42 stored in non-volatile memory, a microprocessor 44, associated main memory 46, and storage space 48 in the form of a magnetic disk drive.

For clarity, the datastore 32 is shown including three databases (32a to 32c), but the actual arrangement of data and the number of databases used is not critical.

Database 32a is used for storing user information for each authorised user. The user information includes preselected preferences; in this embodiment two different types of preferences are available: stock price and exchange rate. For each preference a user can select a predetermined number of entries; for example, a user may select three different companies for which the share price is to be obtained, and the exchange rate between two currencies (such as the pound sterling and the U.S. dollar).

Database 32b is used for storing account details for each user, such as PIN, balance in each account, recent transaction history, and such like information.

Database 32c is used for storing an enrolment application program. The enrolment program assists users in selecting preferences.

The magnetic drive 48 stores a server operating system and a Web server application. In use, the main memory 46 is loaded with the server operating system kernel 50 and the Web server application 54.

In this embodiment the Web server 54 is the Java Web Server (trade mark). The Java Web server 54 includes a database application programming interface (API) 56 for providing SQL access to the datastore 32.

Figure 3:
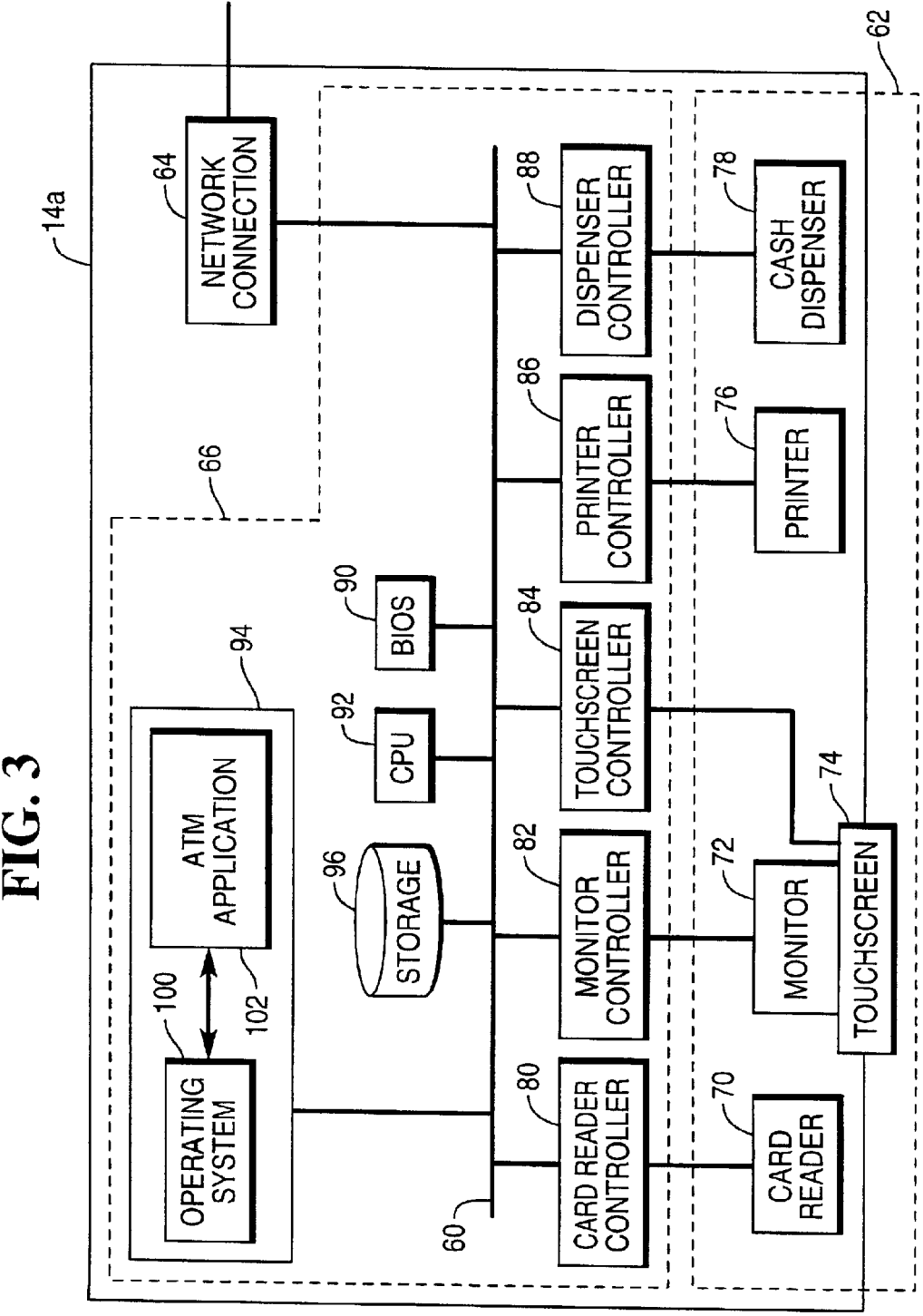
FIG. 3 is a block diagram of one of the terminals of FIG. 1.

Referring to FIG. 3, which shows one of the ATMs 14a in more detail, a system bus (or a plurality of system buses) 60 interconnects a user interface 62, a network connection 64, and an ATM controller 66, to facilitate mutual intercommunication.

The user interface 62 comprises the following user interface elements (peripheral devices): a card reader 70, a monitor 72, a touchscreen module 74 mounted onto the monitor 72, a printer 76, and a cash dispenser 78. The printer 76 delivers receipts and/or statements via a port (in the form of a slot) in a fascia of the ATM 14.

The controller 66 comprises modules for driving the user interface elements 70 to 78, namely: card reader controller 80, monitor controller 82, touchscreen controller 84, printer controller 86, and dispenser controller 88. These user interface elements (70 to 78) and associated controllers (80 to 88) are standard modules that are used on conventional ATMs and will not be described in detail herein.

The controller 66 also comprises a BIOS 90 stored in non-volatile memory, a microprocessor 92, associated main memory 94, and storage space 96 in the form of a magnetic disk drive.

When the ATM is booted up, the controller 66 loads an operating system kernel 100 and an ATM application 102 into memory 94. The ATM application 102 is used to operate the ATM.

Referring to FIGS. 1 to 3, if a user wishes to select preferences for printing onto a receipt during an ATM transaction, then the user accesses the enrolment application program stored in database 32c using PC 22 (or any other Internet access device, such as a WAP phone or a PDA). The enrolment application program is provided on a Web page operated by the Web server 12, so the user enters the appropriate URL on a Web browser executing on PC 22 to access the enrolment application.

Figure 4:
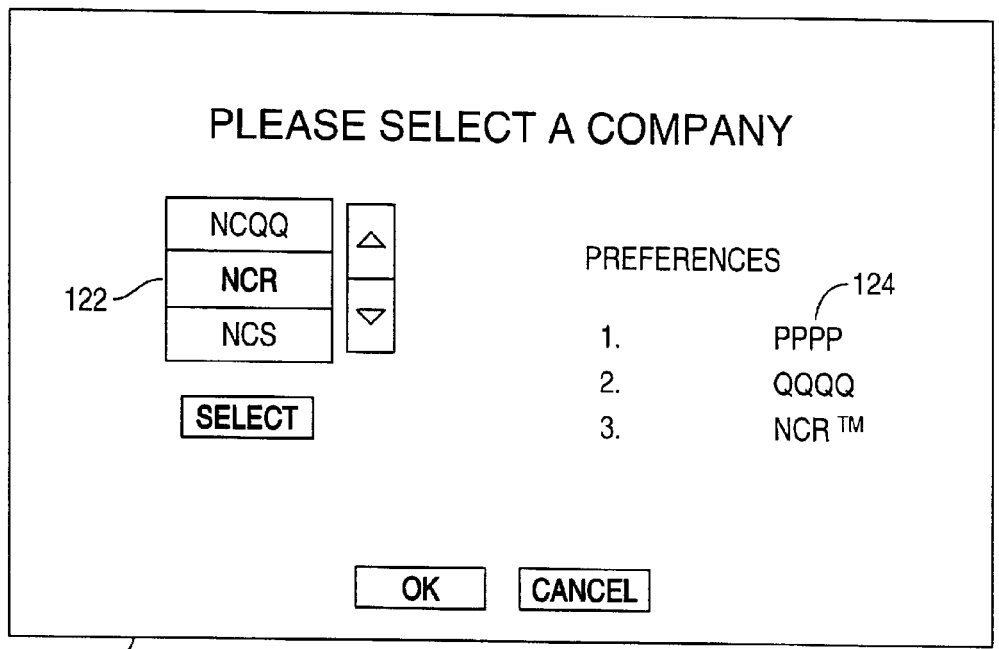
FIG. 4 is a pictorial view of an enrolment screen.
Figure 5:
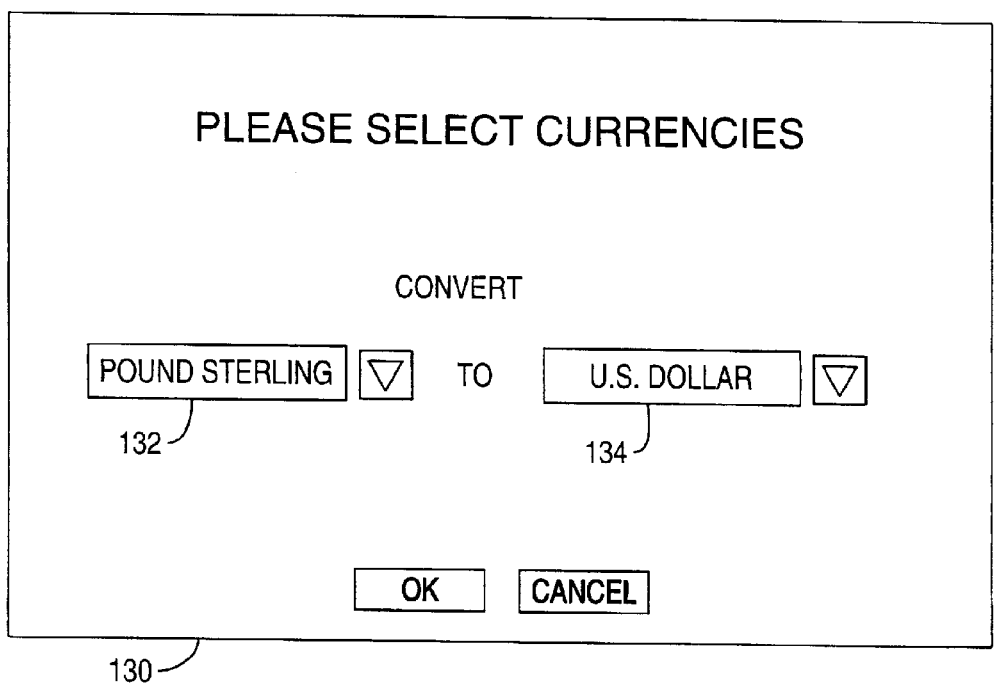
FIG. 5 is a pictorial view of the rear side of a receipt delivered by the terminal of FIG. 1.

As illustrated in FIGS. 4 and 5, the enrolment application allows a user to configure the preferences that will be printed onto a receipt or statement at any ATM 14 in system 10.

In the enrolment process, a first screen 120 (FIG. 4) is presented to the user to allow the user to select the names of the companies (from a list 122) whose stock price they wish to be informed about at each visit to an ATM 14. The selected companies are displayed to the user as a preferences list 124. The server 12 stores the URL of a site from which current share price information can be obtained.

A second screen 130 (FIG. 5) is then presented to the user to allow the user to select a currency from a first drop down menu 132 and another currency from a second drop down menu 134. The server 12 also stores the URL of a site from which current exchange rate information can be obtained.

When the user has finished setting up the preferences, the enrolment data is then transmitted to the server 12, and the server 12 updates the database 32a to store these preferences as an entry associated with the user and indexed by identification data stored on the user's magnetic stripe card, in this embodiment the card number.

At predetermined time intervals (for example, every fifteen minutes), the server 12 updates the current share price information and current exchange rate information for all the preferences stored in database 32a by accessing Web sites providing this information. This updated information is also stored in database 32a and the previous (out of date) information is deleted.

The next time the user uses an ATM 14, the ATM requests the user to insert a card, enter a PIN, and select a transaction. When the ATM 14 authorises the transaction, the ATM 14 receives the current information stored in the database 32a relating to the share prices of companies selected by the user, and relating to the exchange rate for the selected currencies (pound sterling to U.S. dollar). The ATM 14 stores this received current information in memory 94 or in the magnetic disk drive 96.

If the user requests delivery of transaction details, for example printing of a receipt or statement, then the ATM prints the current information on the back of this receipt or statement. The user can then review the current information printed on the receipt or statement, as illustrated in FIG. 6, after leaving the vicinity of the ATM 14.

If the user does not request delivery of transaction details, then the ATM deletes the current information once the user has completed a transaction.

Various modifications may be made to the above described embodiment within the scope of the invention. For example, in other embodiments the font type and size used to print each preference may be selectable by a user. These details may be stored in one of the databases. In other embodiments, the current information may be provided to a user in electronic, optical, or some other format. In other embodiments, the preferences may relate to other information or services.

What is claimed is:

1. A self-service terminal comprising:

a port for outputting transaction details to a user;

means for determining if the user has previously requested to receive a current news article when receiving transaction details;

means for accessing a current news article from a repository providing news articles;

means for appending the current news article obtained to transaction details; and means for delivering the transaction details and the appended current news article to the user via the port, so that the user automatically receives a current news article if the user has previously requested such a service.

2. A method of operating a self-service terminal, the method comprising:

determining if a user has previously requested to receive a current news article when receiving self-service transaction details;

accessing a current news article from a repository providing news articles;

appending the current news article obtained to self-service transaction details; and delivering the self-service transaction details and the appended current news article to the user so that the user automatically receives a current news article if the user has previously requested such a service.

3. A self-service terminal comprising:

a port for outputting transaction details to a user;

means for determining if the user has previously requested to receive a current stock price of a company when receiving transaction details;

means for accessing a current stock price of the company from a repository providing stock prices of companies;

means for appending the current stock price obtained to transaction details; and means for delivering the transaction details and the appended current stock price to the user via the port, so that the user automatically receives a current stock price of the company if the user has previously requested such a service.

4. A method of operating a self-service terminal, the method comprising:

determining if a user has previously requested to receive a current stock price of a company when receiving self-service transaction details;

accessing a current stock price of the company from a repository providing stock prices of companies;

appending the current stock price obtained to self-service transaction details; and delivering the self-service transaction details and the appended current stock price to the user so that the user automatically receives a current stock price of the company if the user has previously requested such a service.

5. A self-service terminal comprising:

a port for outputting transaction details to a user;

means for determining if the user has previously requested to receive a current exchange rate between two currencies when receiving transaction details;

means for accessing a current exchange rate between the two currencies from a repository providing exchange rates;

means for appending the current exchange rate obtained to transaction details; and means for delivering the transaction details and the appended current exchange rate to the user via the port, so that the user automatically receives a current exchange rate between the two currencies if the user has previously requested such a service.

6. A method of operating a self-service terminal, the method comprising:

determining if a user has previously requested to receive a current exchange rate between two currencies when receiving self-service transaction details;

accessing a current exchange rare between the two currencies from a repository providing exchange rates;

appending the current exchange rate obtained to self-service transaction details; and delivering the self-service transaction details and the appended current exchange rate to the user so that the user automatically receives a current exchange rate between the two currencies if the user has previously requested such a service.

\* \* \* \* \*